T. H. WILLIAMS.
TRANSMISSION DEVICE.
APPLICATION FILED JUNE 5, 1912.

1,061,893.

Patented May 13, 1913.
3 SHEETS—SHEET 1.

WITNESSES

INVENTOR
Thomas H. Williams
BY
ATTORNEYS

T. H. WILLIAMS.
TRANSMISSION DEVICE.
APPLICATION FILED JUNE 5, 1912.

1,061,893.

Patented May 13, 1913.
3 SHEETS—SHEET 2.

WITNESSES

INVENTOR
Thomas H. Williams
BY
ATTORNEYS

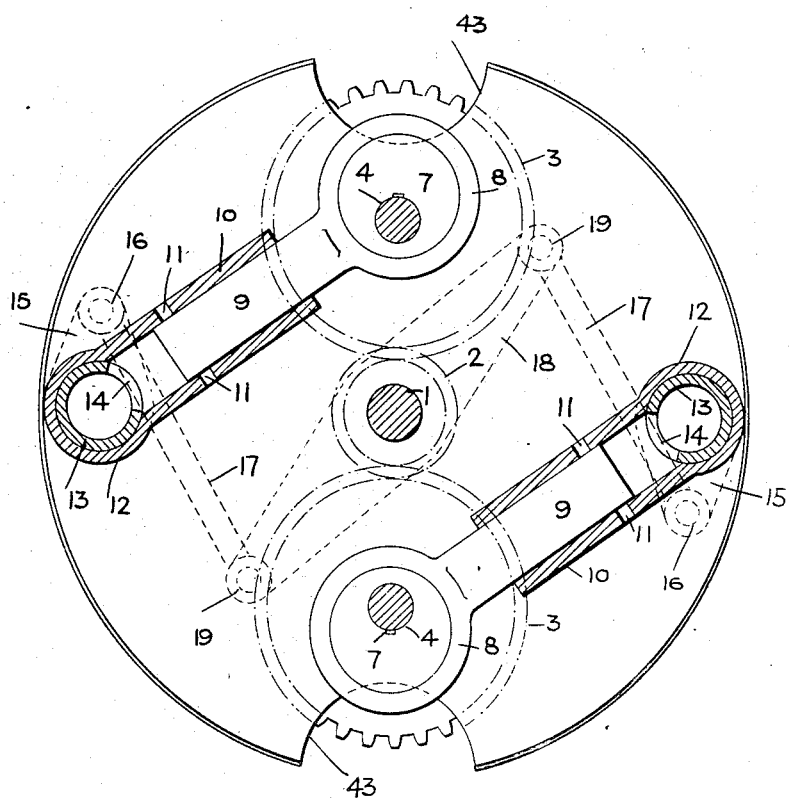

UNITED STATES PATENT OFFICE.

THOMAS H. WILLIAMS, OF BUXTON, IOWA.

TRANSMISSION DEVICE.

1,061,893.  Specification of Letters Patent.  Patented May 13, 1913.

Application filed June 5, 1912. Serial No. 701,801.

*To all whom it may concern:*

Be it known that I, THOMAS H. WILLIAMS, a citizen of the United States, and a resident of Buxton, in the county of Mahaska and State of Iowa, have invented a new and Improved Transmission Device, of which the following is a full, clear, and exact description.

My invention relates to transmission devices; and the primary object thereof is to produce an improvement of the kind mentioned comprising a driving member and a driven member so connected that the driven member can be turned either in the same direction as the driving member or in the reverse direction, or caused to remain stationary without disconnecting any of the component parts of my transmission device which are used for imparting motion from one member to the other.

A further object is to produce a transmission device by means of which the speed, when the driven member is turning in the same direction as the driving member, can be varied or adjusted to any desired extent. I accomplish this without the use of a system of interchangeable gearing, but employ instead a system of fluid control which gives the greatest possible flexibility of regulation.

Reference is to be had to the accompanying drawings forming a part of this specification, in which the same characters of reference indicate the same parts in all the views.

Figure 1:
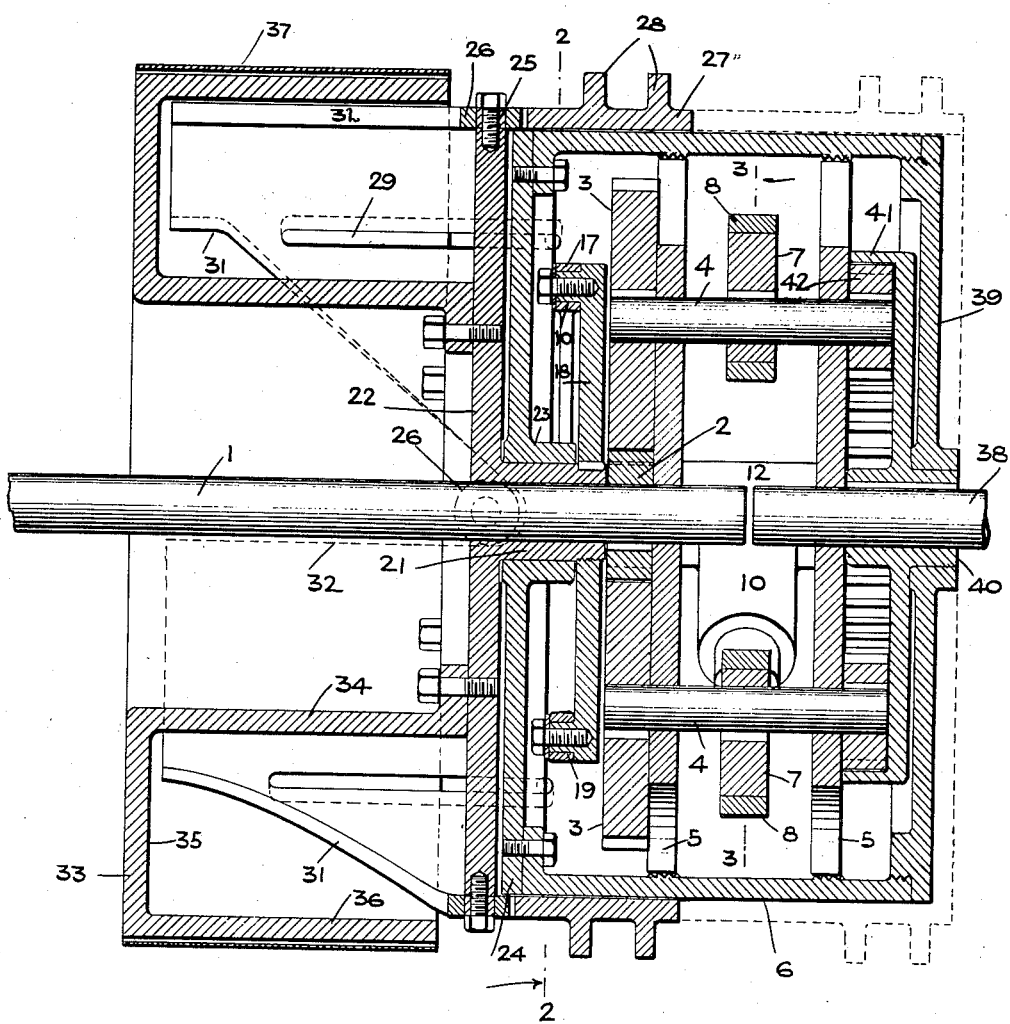
Figure 2:
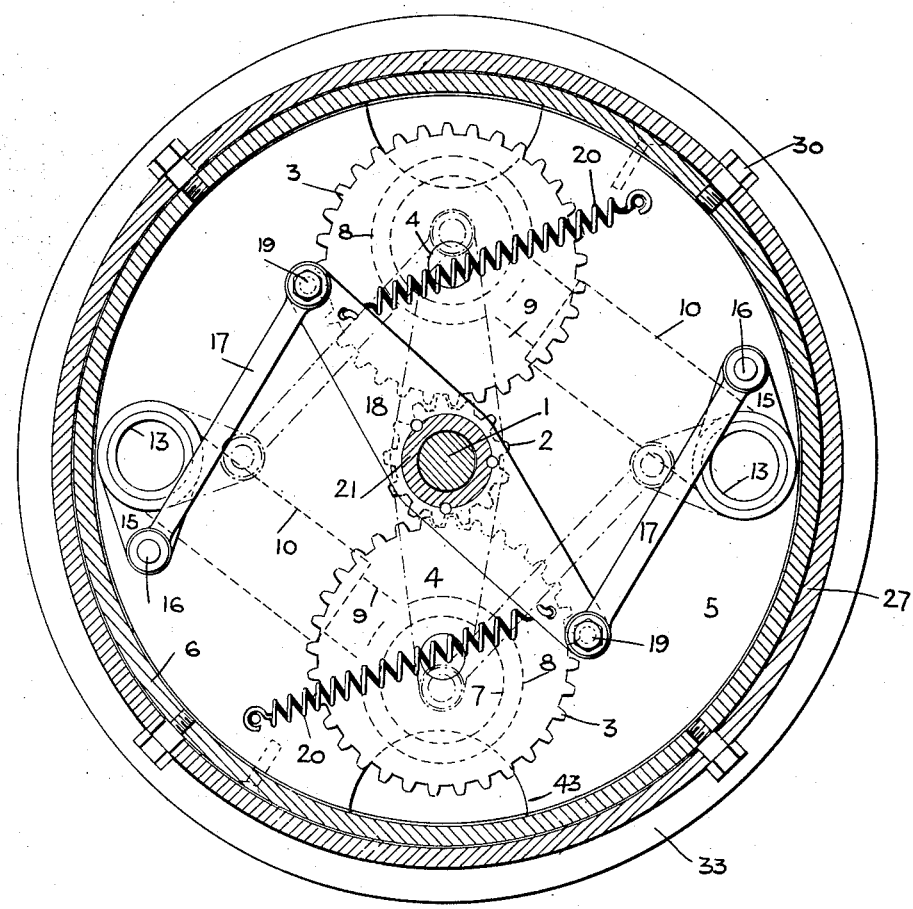

Figure 1 is a longitudinal sectional view of my transmission device; Fig. 2 is a sectional view on the line 2—2 of Fig. 1, looking in the direction of the arrow; and Fig. 3 is a section on the line 3—3 of Fig. 1, looking in the direction of the arrow.

Referring to the drawings, the numeral 1 indicates a driving shaft which is in alinement with a driven shaft shown at 38, and between these two shafts and connected to both of them I arrange the elements of my system of control for obtaining the objects above noted.

On the shaft 1 is mounted a fixed pinion 2 which meshes with a pair of gears 3 keyed to spindles 4 mounted in a pair of plates 5 inclosed by a casing 6. These plates 5 are rigidly secured inside of the casing and turn with the same in a manner that will be hereinafter set forth. On the spindles 4 and between the plates 5 are mounted to turn therewith eccentrics 7 inclosed by means of straps 8 which are connected to or made integral with a pair of plungers 9 reciprocating in cylinders 10. These cylinders 10 have vents or ports 11 through their side walls and are enlarged at their heads, as shown at 12. These heads are provided with transverse cylindrical bores in which are mounted to turn hollow sleeves 13 having ports 14 therein. In practice, the casing 6 will be filled with oil, and this oil will pass into the cylinders 10 through the ports 11 and through the ports 14 in the sleeves 13, and the freedom of flow of the oil or other fluid will be controlled by the degree to which the ports 14 are opened, the sleeves 13 being adjustable for this purpose. The plates 4 may be screw-threaded into the casing 6 and held by bolts shown in Fig. 2. The sleeves 13 pass through the ends of the cylinders and have their ends open, and carry on their adjacent ends near the front of the casing 6, cranks 15 connected by means of pins 16 to links 17. These links 17 are joined to a double crank 18 by means of crank pins 19, this crank or bar 18 being mounted by means of keys to be rigid with a hub 21 of a plate 22 which is located outside of the casing and at the front end of the same. Springs 20 engage the bar 18 and pins on one plate 5, and normally hold it in such position as to keep the ports 14 closed, this position being shown in dotted lines in Fig. 2. The movements of the plate 22 are controlled to turn the hub 21 and the double crank 18 against the action of the springs 20 and thus change the angular position of the sleeves 13, so as to open to a greater or less extent the ports 14 by means of which these sleeves communicate with the interiors of the cylinders 10. The anchor pins for the springs 20 may be secured to the front 24 of the casing if desired.

The hub 21 of the plate 22 is mounted in a bearing 23 carried by the front end 24 of the casing 6, which is bolted in place, and from the peripheral edge thereof project spindles 25 on which are mounted rollers 26. These rollers serve as means for turning the plate 22, and this turning is effected by means of a sleeve 27 having circumferential ribs 28 forming an annular groove at one end of this sleeve, and this groove is engaged by the arms of a yoke, so that the same can be moved backward and forward, as required. The sleeve 27 has longitudinal slots 29 therein and through these slots pass bolts 30 securing the sleeve to the casing 6. Hence, the casing 6 and the sleeve 27 must rotate together, but the sleeve 27 can be moved longitudinally of the casing 6 whenever any adjustment or regulation is necessary. Notches are formed in the end of the sleeve 27 at the end opposite the one bearing the ribs 28, and these notches have inclined edges 31 and axially-extending edges 32, as shown in Fig. 1. The rollers 26 fit within these notches, and the springs 20 acting upon the double crank 18 will hold these rollers against the inclined edges 31; and the position of the parts is normally such that when the sleeve 27 is moved from right to left, referring to Fig. 1, the springs will be tensioned and the ports 14 opened.

33 represents a drum having a hub 34 with an internal flange by means of which this hub is bolted to the plate 22.

35 is a web connecting the hub 34 to a rim 36, and this rim is encircled by means of a band brake 37 to stop the rotation of the drum and therewith the sleeve 27 and casing 6.

The numeral 38 represents the driven shaft in alinement with the driving shaft. This driven shaft is mounted in the rear end 39 of the casing 6, and on the same is keyed a gear 40 having internal teeth 41. These internal teeth are engaged by pinions 42 on the rear ends of the spindles 4; and 43 represents notches in the plates 5, to allow the oil with which the casing 6 is filled to circulate through the same.

The manner of operation of my invention is as follows: The shaft 1 is driven by any suitable source of power, such as a gasolene motor, and I shall assume that the direction of rotation is clockwise, referring to Fig. 2. The band brake 37 will not be applied, and the sleeve 27 will occupy the position shown in full lines in Fig. 1. Hence, the rollers 26 of the plate 22 will be at the inner ends of the inclined edges 31 of the notches in the sleeve 27, and will have moved the plate 22 and therewith the double crank 18 against the tension of the springs 20, to have the ports 14 in full open position. Since the pinion 2 is rotating clockwise, the gears 3 will rotate counterclockwise, and with the same the pinions 42. The movement of these pinions 42 will cause the casing 6, the sleeve 27 and the drum 33 to turn with the shaft 1, but at a slower rate, the internally-toothed gear 41 on the stationary shaft 38 being stationary at this time, with the casing, the sleeve and the drum simply rotating idly, and no power is transmitted to the driven shaft 38. This action is made possible by the fact that with the ports 14 in full open position, the oil with which the casing 6 is filled passes through the ports 11 to the inside of the cylinders 10, and out of the cylinders through the open ends of the sleeves 13. These ports 11 are uncovered on the out stroke of the pistons 9, and on account of the ports 14 being fully opened the flow of oil is free and unobstructed, so that the eccentrics 7 can revolve freely without clogging or braking the rotation of the spindles 4. Consequently, the pinions 42 turn in the manner described and roll around on the inside of the internally-toothed gear 41, and no motion is transmitted from the driving shaft 1 to the driven shaft 38 in consequence. This mode of operation is of course useful when a vehicle, such as an automobile or a boat, when the device is used for marine purposes, is to remain stationary without an attendant having to stop the engine.

In order to cause motion to be transmitted through the shaft 1 to the shaft 38, the sleeve 27 is moved toward the dotted-line position in Fig. 1. As it passes toward the rear of the casing the springs 20 gradually pull the bar 18 and with it the cranks 15, to move the sleeves and the ports 14 therein to closed position, this action being permitted by the inclined edges 31 of the notches in the opposite end of the sleeve. The direction of rotation of the shaft 1 and the pinion 2 is the same as before, but on account of the fact that the ports 14 are closed, the pistons 9 cannot pump oil through the vents 11 into the sleeve 13 and out through the ends of the same. Consequently, the eccentrics 7 stop rotating, and so do the spindles 4. The pinion 2 now carries the gears 3, and consequently the pinions 42, with it bodily without relative rotation thereof and of the spindles 4, and this action causes the internally-toothed gear 41 to turn clockwise and set the driven shaft 38 in rotation. This gives a direct drive ahead at engine speed. If the outlets 14 are only partly closed, as by moving the collar 27 only part of the way toward dotted-line position shown in Fig. 1, the flow of oil will not be entirely prevented through the cylinders 10, but only obstructed to a corresponding extent. This will permit some relative rotation of the gears 3, spindles 4 and pinions 42 without entirely stopping the rotation of the casing 6, collar 27 and drum 33 with respect to the shaft 1, and the shaft 38 will turn in the same direction as the shaft 1, but at a lower speed than the same. Hence, by regulating the position of the sleeve 27 with the yoke, which will engage the groove formed by the ribs or flanges 28, any degree of regulation may be obtained, and any variety of relative speed given to the driven shaft 38; and it will be noted that I accomplish this without the use of interchangeable gears, and at the same time I obtain a wider range of variation and more gradual adjustment of the relative speed of the driven member than could ever be made possible by the use of a combination of parts which are brought into play by turns to replace one another to give the desired results. When it is desired to have the shaft 38 turn in the reverse direction the band 37 is tightened so as to stop the drum 33, the sleeve 27 being first drawn to the dotted line position shown in Fig. 1. This will allow the springs 20 to turn the bar 18 and to close the ports 14, and the plate 22 will also be turned so that the rollers 26 will lie at the ends of the inclined notches 31. On the shaft 1 then being started to rotate clockwise, as before, the casing 6 and sleeve 27 will turn in the same direction as the shaft 1, until the rollers 26, which are held stationary along with the plate 22 and drum 33, cross the notches in the adjacent end of the sleeve 27 and come into contact with the axially-extending edges 32. When this has taken place, the bar 18 will have moved the sleeves 13 against the springs 20 to reopen the ports 14, and this will be seen to be true when it is observed that the rollers 26 when they lie against the edges 32 occupy the same angular position with respect to the sleeve 27 as they did at the inner ends of the inclined edges 31. These rollers will now hold the sleeve 27 and casing 6 against further rotation, and the pinion 2 will transmit motion to the gears 3 and spindles 4 and pinions 42, and through these pinions 42 the gear 41 will revolve in its bearing in the rear end 39 of the casing 6, to turn the shaft 38 in the opposite direction.

From the above description it will be seen that I have devised a transmission device by means of which forward or reverse rotation can be obtained, or the forward speed of the driven shaft 38 varied without the necessity of disconnecting any of the parts. The relative speed of the driven shaft is varied by means of the position of the sliding sleeve 27, and in order to produce either no rotation of the shaft 38 or any relative rate of rotation of this shaft, it is only necessary for the band 37 to be out of operative position. No changeable gears are necessary, and this device not only does away with the necessity of duplicating parts, but it gives a more gradual adjustment, and a wider range of adjustment than could be obtained by the use of sliding gears within practical limits. Furthermore, when it is desired to change the direction of rotation of the shaft 38, it is only necessary that the brake 37 should be applied and the engine being slowed down to avoid too great a strain on the parts.

I wish to have it understood that the drawings and description set forth but one embodiment of my invention; that I do not care to be limited to the exact details disclosed, but I reserve to myself the right to make such changes in the shape, size and arrangement of the parts as fairly fall within the scope and spirit of my invention.

Having thus described my invention, I claim as new and desire to secure by Letters Patent:

1. In a transmission device, the combination of a driving member, a driven member, means for imparting motion from the driving member to the driven member, and means for controlling said last-named means to enable the relative speed of the driven member to be adjusted to any desired extent, and means acting upon the controlling means for reversing the driven member.

2. In a transmission device, the combination of a driving member, a driven member, means for imparting motion from said driving member to the said driven member, fluid-controlled means for enabling the relative speed of the driven member to be adjusted to any desired extent, and means acting upon the fluid controlled means for reversing the driven member.

3. In a transmission device, the combination of a driving member, a driven member, a movable casing, means carried by said casing to cause motion to be imparted from the driving member to the driven member, means for controlling the action of said last-named means to cause the casing and said motion-imparting means to move idly, or to cause the driven member to move therewith, and means for arresting the casing and acting upon the controlling means to reverse the driven member.

4. In a transmission device, the combination of a driving member, a driven member, a movable casing, means mounted in said casing for imparting motion from the driving member to the driven member, fluid-controlled means for causing the casing and the motion-imparting means to move idly, or to cause the driven member to be moved therewith, and means for arresting the casing and acting upon the controlling means for reversing the driven member.

5. In a transmission device, the combination of a driving member, a driven member, a movable casing, means carried by said casing for imparting motion to the driven member, controlling means for causing the casing and the motion-imparting means to rotate idly, or to cause the driven member to be moved therewith at any desired speed with respect to the driving member, and means for arresting the casing and acting upon the controlling means to reverse the driven member.

6. In a transmission device, the combination of a driving member, a driven member, a movable casing, an internally-toothed gear carried by said casing and connected to the driven member, means carried by the casing and engaging said internally-toothed gear for imparting motion from the driving member to the driven member, and means for controlling the action of said motion-imparting means enabling the means for engaging the internally-toothed gear to rotate idly within the same, and the casing to rotate idly therewith, or for causing the driven member to move with said driving member.

7. In a transmission device, the combination of a driving member, a driven member, a movable casing, means carried by said casing for imparting motion from the driving member to the driven member, means for controlling the action of said motion-imparting means, said controlling means projecting from said casing, means carried by the casing and movable with respect thereto for actuating said controlling means, and means for arresting the casing and acting upon the controlling means to reverse the driven member.

8. A transmission device comprising a driving member, a driven member, a movable casing, means carried by said casing for imparting motion from the driving member to the driven member, means for controlling said motion-imparting means to enable the same and said casing to rotate idly, or to cause the driven member to be moved therewith, said controlling means projecting from said casing, and means engaging said controlling means to arrest the same when the driven member is to be moved in the reverse direction.

9. In a transmission device, the combination of a driving member, a driven member, an internally-toothed gear secured thereon, a movably-mounted casing, a pinion carried by the driving member, a spindle rotatably carried by the casing, gears thereon to mesh with the pinion on the driving member and the gear on the driven member, an eccentric carried by said spindle, a plunger operated by said eccentric, a cylinder receiving said plunger, said cylinder having an overrun port through its wall to admit fluid carried by the casing to the interior of the cylinder, a sleeve having a port therein and having open ends for controlling the exit of fluid from said cylinder, means for actuating said sleeve, resilient means engaging said actuating means carried by said casing to hold the sleeve in position to close the port therein, a plate secured to said actuating means and located outside of said cylinder, and a sliding sleeve having notches for engaging said plate, said sliding sleeve being rotatable with said casing and movable longitudinally thereof to adjust said actuating means.

10. In a transmission device, the combination of a driving member, a driven member, an internally-toothed gear thereon, a movable casing, a driving pinion carried by the driving member, a spindle rotatably carried by the casing, gears thereon for engaging the driving pinion, and the internally-toothed gear, an eccentric carried by the spindle, a plunger operated by the eccentric, a cylinder having an overrun port receiving said plunger, an open-ended sleeve carried by said cylinder and having a port therein, said overrun port and said sleeve admitting fluid carried by the casing into said cylinder and controlling the discharge therefrom, means for actuating said sleeve, resilient means for holding said actuating means in position to keep the port in the sleeve closed, means secured to the actuating means and located outside of the cylinder for controlling the same, a drum secured to said controlling means, and a band for engaging the drum and holding the same, together with the casing, against rotation.

11. In a transmission device, the combination of a driving member, a driven member, a casing, means inclosed by said casing for imparting motion from the driving member to the driven member, and means located within the casing and operable from without the same to enable the relative speed of the driven member to be adjusted to any desired extent.

12. In a transmission device, the combination of a driving member, a driven member, a casing, means inclosed by said casing for imparting motion from the driving member to the driven member, controlling means mounted upon the casing to enable the relative speed of the driven member to be adjusted to any desired extent, and means acting upon the controlling means for reversing the driven member.

13. In a transmission device, the combination of a driving member, a driven member, a casing, means inclosed by the casing for imparting motion from the driving member to the driven member, and means secured to the casing movable longitudinally thereof for controlling said last-named means to enable the relative speed of the driven member to be adjusted to any desired extent.

14. In a transmission device, the combination of a driving member, a driven member, a casing, means inclosed by the casing for imparting motion from the driving member to the driven member, means secured to the casing movable longitudinally thereof for controlling said last-named means to enable the relative speed of the driven member to be adjusted to any desired extent, and means acting upon the controlling means for reversing the driven member.

15. The combination of a driving member, a driven member, a casing, means inclosed in the casing for imparting motion from the driving member to the driven member, a sleeve surrounding the casing, and means controlled by the sleeve for enabling the relative speed of the driven member to be adjusted to any desired extent.

16. The combination of a driving member, a driven member, a casing, means inclosed in the casing for imparting motion from the driving member to the driven member, a sleeve surrounding the casing, means controlled by the sleeve for enabling the relative speed of the driven member to be adjusted to any desired extent, and means for engaging the sleeve and acting upon the said last-named means to reverse the driven member.

17. In a transmission device, the combination of a driven member, means comprising a rotary member for transmitting motion to the driven member, means engaging said rotary member for retarding the motion of the same, controlling means for said retarding means, and a sleeve having cam-shaped recesses to actuate the controlling means.

18. In a transmission device, the combination of a driven member, means comprising a rotary member transmitting motion to the driven member, means engaging said rotary member for retarding the motion of the same, controlling means for said retarding means, a sleeve having cam-shaped recesses to actuate the controlling means, and means for engaging the sleeve and acting upon the controlling means to reverse the driven member.

19. In a transmission mechanism, the combination of a driving member, a driven member, means for imparting motion from the driving to the driven member, a plunger actuated by the last-named means, a casing therefor, means for controlling said plunger and casing located in the casing and operable from without the same, and a sleeve for actuating said controlling means.

20. In a transmission mechanism, the combination of a driving member, a driven member, means for imparting motion from the driving to the driven member, a plunger actuated by the last-named means, a casing therefor, means for controlling said plunger and casing, a sleeve for actuating said controlling means, and means for engaging the sleeve and acting upon the controlling means to reverse said member.

In testimony whereof I have signed my name to this specification in the presence of two subscribing witnesses.

THOMAS H. WILLIAMS.

Witnesses:
    JNO. CRUIKSHANK,
    JAS. K. WILLIAMS.